(12) United States Patent
Steiner et al.

(10) Patent No.: US 9,055,082 B2
(45) Date of Patent: Jun. 9, 2015

(54) PEER TO PEER LOCALIZATION FOR CONTENT IN A DISTRIBUTED HASH TABLE

(75) Inventors: Moritz Steiner, Red Bank, NJ (US); Matteo Varvello, Port Monmouth, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 456 days.

(21) Appl. No.: 12/868,454

(22) Filed: Aug. 25, 2010

(65) Prior Publication Data
US 2012/0054322 A1 Mar. 1, 2012

(51) Int. Cl.
G06F 15/173 (2006.01)
H04L 29/08 (2006.01)

(52) U.S. Cl.
CPC .......... H04L 67/104 (2013.01); H04L 67/1065 (2013.01); H04L 67/1021 (2013.01); H04L 67/1002 (2013.01)

(58) Field of Classification Search
CPC ............ H04L 67/1002; H04L 67/1021; H04L 67/1065
USPC .......... 709/203, 223, 224, 230, 232; 707/758; 718/105; 370/311
See application file for complete search history.

(56) References Cited

U.S. PATENT DOCUMENTS

| | | | |
|---|---|---|---|
| 5,404,488 A * | 4/1995 | Kerrigan et al. | 711/133 |
| 7,103,772 B2 * | 9/2006 | Jorgensen et al. | 713/168 |
| 8,584,228 B1 * | 11/2013 | Brandwine et al. | 726/15 |
| 2005/0223102 A1 * | 10/2005 | Zhang et al. | 709/228 |
| 2008/0109448 A1 * | 5/2008 | Aboel-Nil et al. | 707/10 |
| 2008/0201718 A1 * | 8/2008 | Zohar | 718/105 |
| 2009/0252071 A1 * | 10/2009 | Nurminen et al. | 370/311 |
| 2011/0010578 A1 * | 1/2011 | Agundez Dominguez et al. | 714/4 |

FOREIGN PATENT DOCUMENTS

CN 101106503 A 1/2008

OTHER PUBLICATIONS

Maymounkov et al., "Kademlia: A Peer-to-Peer Information System Based on the XOR Metric," Lecture Notes in Computer Science, Jan. 2002, pp. 53-65.*
Steiner et al., "Where Is My Peer? Evaluation of the Vivaldi Network Coordinate System in Azureus", Networking 2009, LNCS 5550, pp. 145-156, 2009.

(Continued)

*Primary Examiner* — Phuoc Nguyen
*Assistant Examiner* — Davoud Zand
(74) *Attorney, Agent, or Firm* — Harness, Dickey & Pierce, P.L.C.

(57) ABSTRACT

Provided is a method for localizing content in a peer-to-peer network. The method includes receiving a message announcing first content. Storing a <key, value> pair in a table based on the message. The key represents content information and the value represents node information. The node information identifies a node announcing the content, and the content information identifying the content. Storing a plurality of first variation keys in the table. Each of the plurality of first variation keys being a variation of the stored first key. The method further includes intercepting a request message and sending a response to a sender of the request message. The response message including the list of nodes, the list of nodes based on a key based on a destination address of the request message and the table.

20 Claims, 10 Drawing Sheets

(56) References Cited

OTHER PUBLICATIONS

Varvello et al., "Large Scale Monitoring and Analysis of BitTorrent", Bell Labs, Alcatel-Lucent, Holmdel, USA, pp. 1-13.
Maymounkov et al., "Kademlia: A Peer-to peer Information System Based on the XOR Metric", http://kademlia.scs.cs.nyu.edu, pp. 1-6.
Choffnes et al., "Taming the Torrent: A Practical Approach to Reducing Cross-ISP Traffic in Peer-to-Peer Systems", SIGCOMM '08, Aug. 17-22, 2008, Seattle, Washington, USA, pp. 363-374.
Ledlie et al., "Network Coordinates in the Wild", NSDI '07: 4th USENIX Symposium on Networked Systems Design & Implementation, pp. 299-312.
Dabek et al., "Vivaldi: A Decentralized Network Coordinate System", SIGCOMM '04, Aug. 30-Sep. 3, 2004, Portland, Oregon, USA.
Steiner et al., "Exploiting KAD: Possible Uses and Misuses", Institut Eurecom, Sophia-Antipolis, France.
Andrew Loewenstern, "BEP 5: DHT Protocol," last modified on Feb. 28, 2008.
Andrew Loewenstern, "XP002659821," last modified on Feb. 28, 2008, retrieved from the Internet, URL:htty://www.bittorrent.org/beps/bep_0005.htm, on Sep. 22, 2011.
R. Penno et al., "ALTO Protocol," draft-penno-alto-protocol-04.text, No. 4, Oct. 26, 2009.
PCT International Search Report and Written Opinion of the International Searching Authority.
Andrew Lowenstern, and Arivd Norberg, "DHT Protocol," draft of BitTorrent.org, Feb. 29, 2008.
Translation of Korean Office Action dated Apr. 3, 2014 in corresponding Korean Application No. 10-2013-7007122.
Office Action for corresponding Chinese Application No. 201180040937.6 dated Feb. 2, 2015 and English translation thereof.

\* cited by examiner

Related Art

| Key | Value |
|---|---|
| hash_0 | node_ID = computer_1 |
|  |  |
|  |  |
| hash_500 | node_ID = computer_2 |
|  |  |
|  |  |
|  |  |

FIG. 4A

| Key | Value |
|---|---|
| hash_0 | Node_ID = computer_1 |
|  |  |
|  |  |
| hash_500 | node_ID = computer_2 |
|  |  |
| hash_550 | node_ID = computer_2, content = content_1 |
|  |  |
|  |  |

FIG. 4B

| Key | Value |
|---|---|
| hash_0 | Node_ID = computer_1 |
| | |
| hash_547 | node_ID = computer_2,content = content_1 |
| hash_548 | node_ID = computer_2,content = content_1 |
| hash_549 | node_ID = computer_2,content = content_1 |
| hash_550 | node_ID = computer_2,content = content_1 |
| hash_551 | node_ID = computer_2,content = content_1 |
| hash_552 | node_ID = computer_2,content = content_1 |
| hash_553 | node_ID = computer_2,content = content_1 |
| | |
| | |

FIG. 4C

| Key | Value |
|---|---|
| hash_0 | Node_ID = computer_1 |
| | |
| hash_547 | node_ID = computer_2,content = content_1 |
| hash_548 | node_ID = computer_2,content = content_1 |
| hash_549 | node_ID = computer_2,content = content_1 |
| hash_550 | node_ID = computer_2,content = content_1 |
| hash_551 | node_ID = computer_2,content = content_1; node_ID = computer_3 |
| hash_552 | node_ID = computer_2,content = content_1 |
| hash_553 | node_ID = computer_2,content = content_1 |
| | |
| | |

FIG. 4D

| Key | Value |
|---|---|
| hash_0 | Node_ID = computer_1 |
| | |
| hash_547 | node_ID = computer_2, content = content_1 |
| hash_548 | node_ID = computer_2, content = content_1 |
| hash_549 | node_ID = computer_2, content = content_1;<br>node_ID = computer_3, content = content_2 |
| hash_550 | node_ID = computer_2, content = content_1 |
| hash_551 | node_ID = computer_2, content = content_1;<br>node_ID = computer_3 |
| hash_552 | node_ID = computer_2, content = content_1 |
| hash_553 | node_ID = computer_2, content = content_1 |
| | |
| | |

FIG. 4E

| Key | Value |
|---|---|
| hash_0 | Node_ID = computer_1 |
| | |
| hash_547 | node_ID = computer_2, content = content_1 |
| hash_548 | node_ID = computer_2, content = content_1 |
| hash_549 | node_ID = computer_2, content = content_1;<br>node_ID = computer_3, content = content_2;<br>node_ID = computer_4, content = content_2;<br>node_ID = computer_5, content = content_2;<br>node_ID = computer_6, content = content_2;<br>node_ID = computer_7, content = content_2 |
| hash_550 | node_ID = computer_2, content = content_1 |
| hash_551 | node_ID = computer_2, content = content_1;<br>node_ID = computer_3 |
| hash_552 | node_ID = computer_2, content = content_1 |
| hash_553 | node_ID = computer_2, content = content_1 |
| | |
| | |

FIG. 4F

PEER TO PEER LOCALIZATION FOR CONTENT IN A DISTRIBUTED HASH TABLE

BACKGROUND OF THE INVENTION

Embodiments relate to peer-to-peer file sharing networks and a method for localizing peer-to-peer traffic.

DESCRIPTION OF THE RELATED ART

Some versions of peer-to-peer file sharing networks rely on a centralized computer or network of network elements to list all of the available content in the network. Other peer-to-peer file sharing networks do not rely on centralized components to list all of the available content on a network. Rather, the directory is distributed as the content itself is distributed. The technique used to distribute the directory database on all participating clients is sometimes referred to as a distributed hash table (DHT).

Whether the network is a centralized type network or a network using a DHT, peers download content from one peer to another without regard to the locality of a peer from which content is shared. As a result, if a peer requests a file contained on a another peers' computer, the computer containing the file may be located far away from the peer requesting the file. This results not only in file transfer delays, but increased cost as the link between the peers must go through one or more internet service providers (ISPs). Thus, such peer-to-peer type of connections can create a large amount of traffic on transit links linking ISPs together, thereby increasing costs to network operators.

For example, assume there is a popular content file and that there are 10,000 users world-wide that have this file on their computers. Assume 50 of those 10,000 users may be located within a given ISP "A". Assume a peer within ISP "A" is interested in the popular file and requests the directory, either the centralized or DHT type directory for 50 random peers from which to download the file. In such an instance there is a chance of 0.5% of finding a single peer within ISP "A." There is a chance close to zero that if 50 peers having the file are randomly identified to the requesting peer, that all 50 peers will be inside ISP "A."

In such a scenario, while there are an ample number of peers within the same ISP as the peer requesting the file, the chances are that the peer will end up receiving the file from a peer located outside the requesting peers' ISP. This requires unnecessary traffic on a transit link between ISPs.

FIG. 1 shows a schematic diagram of centralized peer-to-peer system 10. The centralized peer-to-peer system 10 includes computers 12 which are also referred to as peers and/or nodes 12 and a central computer 14. The peers and/or nodes 12 are connected to the central computer 14 via connections 16. The connections 16 may be any suitable connection such as wireless connection, Ethernet connection or combination of any suitable connection hardware or methods.

While the peer-to-peer system 10 shows only four peers and/or nodes 12 and a single central computer 14, it is to be understood that a peer-to-peer system is not limited to the number of peers and/or nodes 12 shown and central network component of a single central computer 14. In fact, the peer-to-peer system 10 may include many more peers and/or nodes 12 and many computers, servers or other components may accomplish the tasks of the central computer 14 shown.

In a centralized peer-to-peer system 10 as shown in FIG. 1, when a peer and/or node 12 requests content or a file, the request is sent via the connection 16 to the centralized computer 14. Sending requests are well known in peer-to-peer networks.

The centralized computer 14 determines what peers and/or nodes 12 have the requested content and may respond to the request with information regarding what peers and/or nodes 12 have the requested content. The centralized computer 14 may identify several peers and/or nodes 12 having the requested content and respond with information regarding multiple identified peers and/or nodes 12. Once a peer and/or node 12 or peers and/or nodes 12 is/are identified, the requesting peer may then receive the requested file from one of the identified peers.

The centralized computer 14 may make a determination of which peers and/or nodes 12 among many peers and/or nodes 12 that may contain the requested content that should be identified to the requesting peer in order to reduce large amounts of data being transmitted over transit links. These decisions may be made to localize peer-to-peer traffic. This determination will be described in more detail later below.

For example, one well known file sharing system for peer-to-peer networks is known as BITTORRENT. The mechanisms the BITTORRENT file sharing system uses to discover peers impact the structure of the P2P network and consequently the data dissemination. Thus, the knowledge of the peer discovery in the BITTORRENT file sharing system is fundamental for a clear understanding of traffic localization. The BITTORRENT file sharing system employs a tracker or central server (e.g., centralized computer 14) in order to discover peers and coordinate file exchanges. Peers retrieve the address of the tracker within a torrent they download from the web. A "torrent" is a meta data file that contains useful information for the file exchange.

Initially, a peer contacts the tracker to retrieve a list of peers that hold the file or a portion of it. The tracker answers with the peer-list, a random subset of active peers generally composed by 50 peers. Afterwards, a peer interacts with the tracker regularly in order to send information about the volume of bytes the peer has downloaded or uploaded. In response, the tracker sends to the peer a new peer-list. The frequency of communications between the client and the tracker is regulated by the tracker via a min interval field contained in the tracker replies. Generally, it is set to 15 minutes.

As indicated above, the peer-list is a random subset of active peers. The peer-list in no way includes localization of peers within a network (e.g., an Internet service provider network (ISP) network). Some efforts have been made to leverage the tracker or central server (e.g., centralized computer 14) for localization. However, these efforts are outside the scope of this disclosure.

SUMMARY OF THE INVENTION

One embodiment includes a method for localizing content in a peer-to-peer network. The method includes receiving a first message announcing first content. Storing a first key in a table based on the first message. The first key representing first node information and first content information. The first node information identifying a first node announcing the first content, and the first content information identifying the first content. Storing a plurality of first variation keys in the table. Each of the plurality of first variation keys being a variation of the stored first key.

Another embodiment includes a method for localizing content in a peer-to-peer network. The method includes intercepting a request message. The request message being a request for content, the request message including a destination address. Determining a first key based on the destination address. Determining a list of nodes based on the first key and a table. The table including a plurality of entries. Each entry having one of a key and a variation key. At least one key being based on an announce message. The key representing node information and content information. The node information identifying a node announcing content and the content information identifying the content and each variation key being a variation of one of the keys. Sending a response to a sender of the request message. The response message including the list of nodes

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIGS. 4A-4F illustrate a DHT according to example embodiments.

Figure 1:
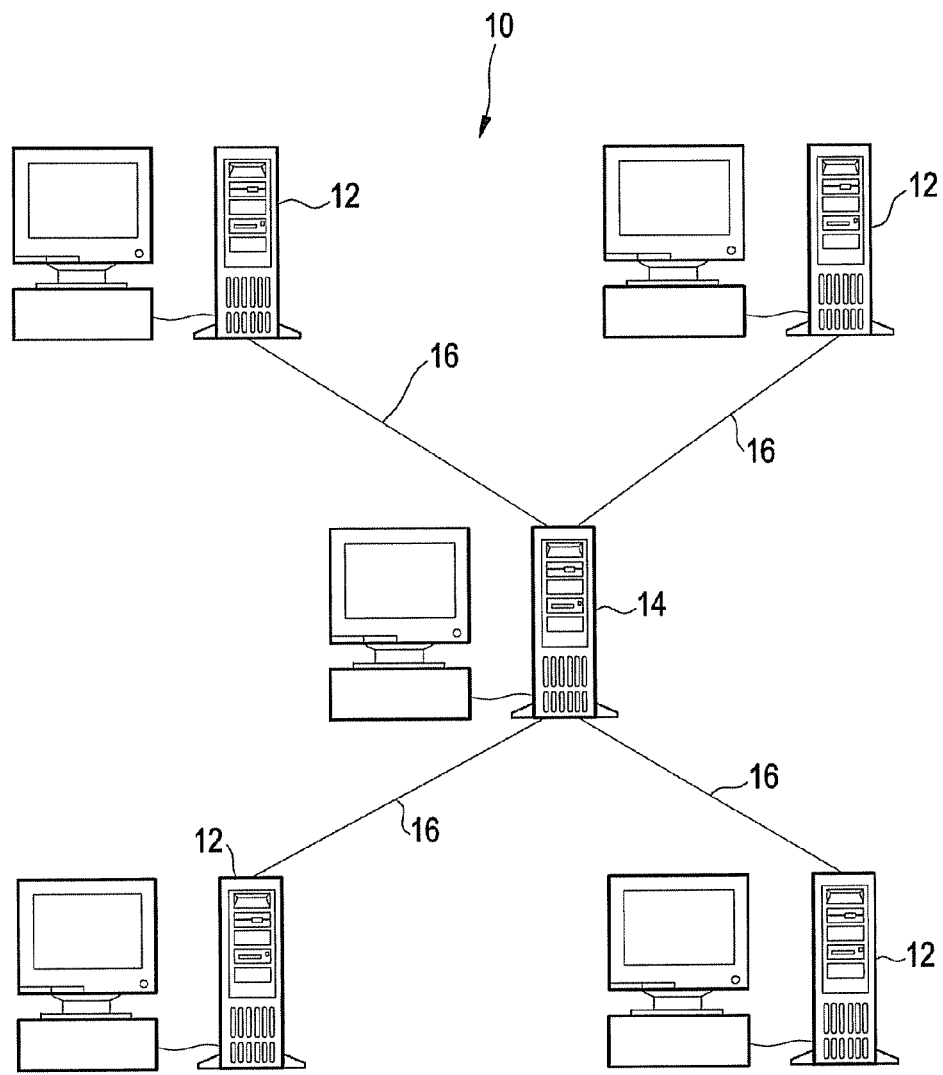
FIG. 1 illustrates a related art schematic diagram of a peer-to-peer file sharing network having centralized components.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

The terms "peer" and "node" are used interchangeably throughout this disclosure. Generally, a peer refers to the physical hardware within the peer-to-peer network. A peer may also be a node. However, a node may also more generally refer to a logical instance of, for example a file location (e.g., address or reference in a table) within the peer-to-network.

Figure 2:
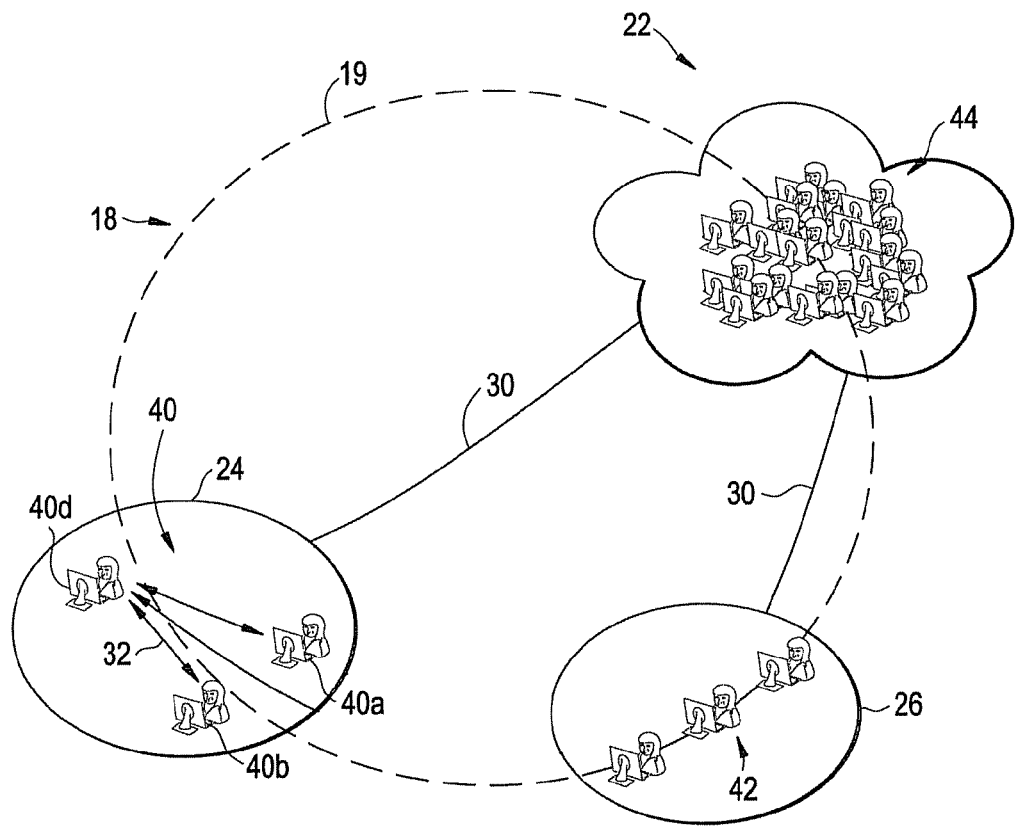
FIG. 2 illustrates a schematic diagram of a peer-to-peer file sharing network utilizing a distributed hash table (DHT) in accordance with example embodiments.

FIG. 2 is a schematic diagram of a peer-to-peer network 18 in accordance with an example embodiment. In the peer-to-peer network 18 shown in FIG. 2, there is no central computer 14. While not shown, it should be understood that peers 40, are connected by connections to each other.

FIG. 2 shows a peer-to-peer file sharing network 18. The network 18 of FIG. 2 does not rely on centralized components to list the network contents, but rather uses a uses a distributed hash table (DHT) 19 to distribute the directory database to all participating clients. The DHT 19 is represented in FIG. 2 as a broken line connecting all aspects of the network 18 together.

The file sharing network 18 includes a first Internet service provider (ISP) 24 and a second ISP 26. Within the ISP 24 are various clients, which may also be referred to as peers, nodes or users 40. The various clients, peers or users will be distinguished from amongst other peers on the same ISP by adding a letter behind the reference numeral.

A second ISP 26 is also shown having various peers 42. The first ISP 24 and the second ISP 26 may be connected together via a peering link 28.

The Internet at large 22 is illustrated in FIG. 2. ISP 24 may be connected to the internet at large 22 by a transit link 30. A transit link 30 may also connect ISP 26 to the Internet at large 22. Peers located on the Internet at large 22 are identified by reference number 44. Like the peers 40 and 42, the peers 44 on the Internet at large 22 are associated with at least one ISP. However the ISP's associated with the peers 44 on the Internet at large 22 are not shown.

Due to the amount of resources (for example, peering links 28 or transit links 30) needed for sharing files between peers 40, 42, 44 associated with different ISPs 24, 26, it may be preferred, whenever possible, to have peers within a particular ISP share files amongst each other rather than sharing files between peers located on different ISPs.

The arrows 32 illustrate a preferred way of file sharing where the peers 40a, 40b, and 40d share files between each other. All of the peers 40a, 40b, and 40d are located on the ISP 24. There may be some situations that develop where a peer 40 located within an ISP 24 requests a file that is not contained by any peer also located on ISP 24. Therefore, in order to obtain the requested content, the peer 40 must obtain content from a user located either in ISP 26 or the Internet at large 22.

Figure 3:
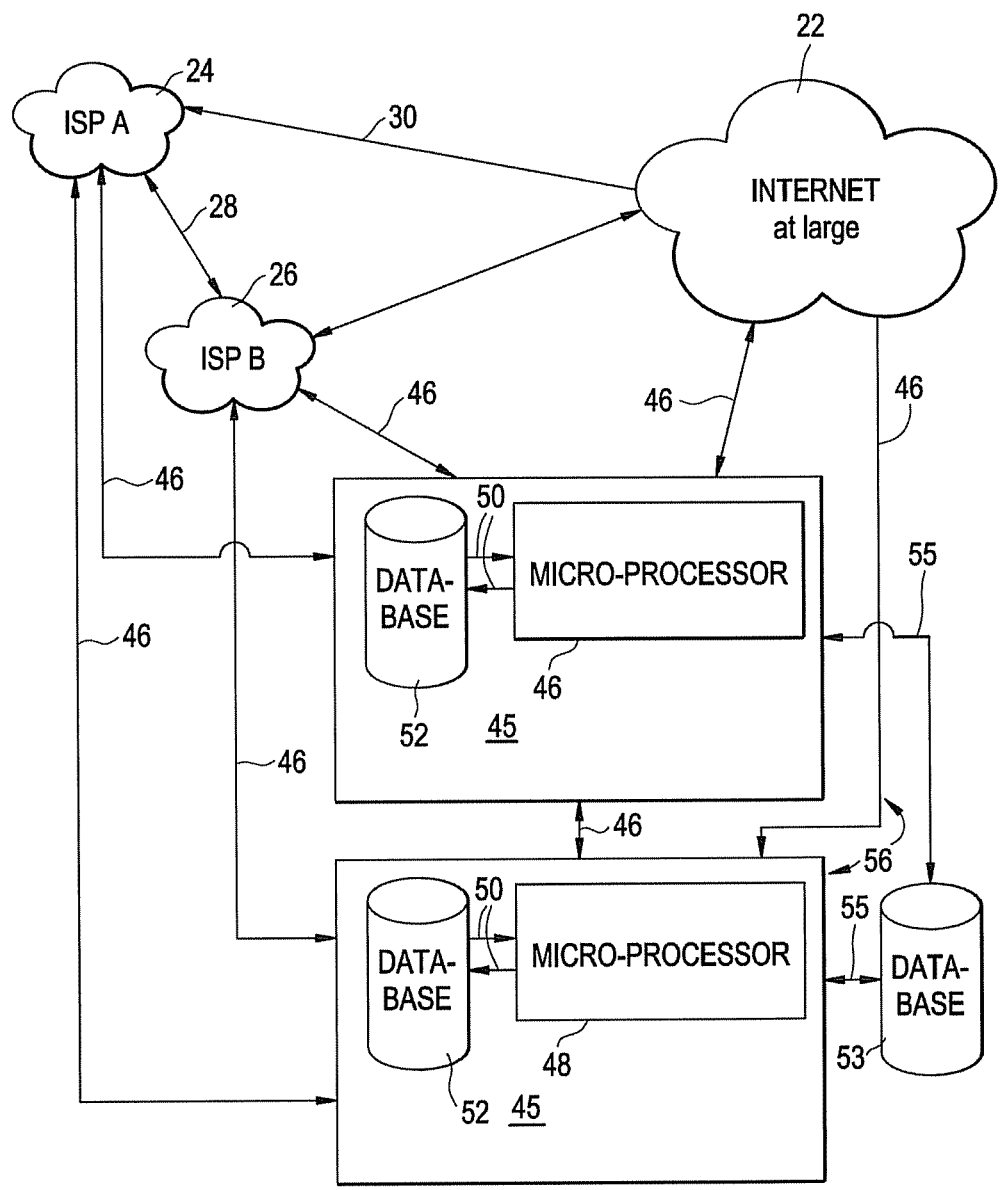
FIG. 3 illustrates a schematic diagram of a file sharing network in accordance with example embodiments and illustrates various components of a computer in communication with the file sharing network.

FIG. 3 is a schematic diagram illustrating various ISPs 24, 26, the Internet at large 22, and network components (which may also be referred to as computers, or network elements). The network elements 45 may be distributed throughout the network as shown above with regard to FIG. 2. For example, in peer-to-peer file sharing networks, such a file sharing network 18 that has no centralized computer 14, but rather uses a DHT 19, the computer or network elements 45 may be distributed throughout the file sharing network. Alternatively, the network elements 45 may be merely connected with the various ISPs 24 and 26, and the Internet at large 22 via connections 46.

As shown in FIG. 3, the network elements 45 may include one or more micro processors 48 connected via connections 50 to a database 52. The network elements 45 may also be operatively connected to another database 53 via connections 55. The database 53 may be searchable and may be able to provide information to the network elements 45 such as what ISP is associated with a given peer as explained in more detail later below.

In some embodiments of the invention, the network elements 45 may be already existing system components connected to the network. Existing network elements 45 may be programmed to perform the functions described herein. For example, existing networks may include network components programmed to preform the function described herein. In other embodiments, the network elements 45 may be added to the network (rather than existing network components) and configured to perform the functions described herein.

Example embodiments operate according to two processes. The first process includes intercepting all announce peer messages and updating the DHT 19. As one skilled in the art knows, the announce peer messages are used by a peer to communicate that it holds a file or content and/or some portion of the file or content. For example, peer 40 may include network element 45. Micro-processor 46 may be configured to intercept the peer messages. The peer messages may be from peers (e.g., peer 40) publishing in the distributed hash table (DHT) that the peer holds a file or a portion of it.

It may be that ISP 24 and ISP 26 communicate with each other often and therefore, the peering link 28 may have a higher capacity or may be able to operate at lower cost than a general transit link, which would link the ISP 24 with another ISP.

As is known, a single physical entity can join a point-to-point network many times with many distinct logical identities. These logical identities may be called sybils. The logical identities may have a unique identifier or key computed using, for example, a hash function. The hash function may be performed on, for example, information associated with a node and/or content. In example embodiments, a node or peer (e.g., peer 40a) may have a unique identifier or key and a file or content may have a unique identifier or key. As is known, capturing the traffic directly exchanged between clients associated with an internet service provider (ISP) scale is generally unfeasible if not impossible. In fact, data collection would require the setup of hundreds of thousands of filtering rules at each ISP router. As is known, ISP routers do not have this capability.

Therefore, example embodiments insert in the DHT 19 several logical identities with identifiers or key close to the unique identifier or key of the file or content. The logical entities are then used to intercept the announce peer messages.

The second process may include intercepting messages requesting a list of peers holding the file or content and replying to the messages with local peer-sets or lists of nodes. As discussed above with regard to the announce peer messages, the logical entities may also intercept the messages requesting a list of peers holding the file at some iterative search along the DHT. The DHTs are used to respond to these content requests. Namely, the engine for these processes is the DHT client at each node.

As is known a DHT 19 is used to distribute the directory database on all participating clients or nodes. As is known, the directory database is a listing of all of the peers (e.g., computers or physical machines) in the peer-to-peer network as well as all of the content (e.g., files, video, audio or the like) located on each of the peers.

Initially, a DHT 19 may only maintain references to physical nodes or peers (see FIG. 4A) and/or references to files or content (see FIG. 4B). As described above, these references are maintained as logical identities. The logical identities may have a unique identifier or key computed using, for example, a hash function.

The files or content may be stored on node that is not necessarily the node including the DHT 19 having the reference to the file or content. For example, the node having on which the file or content is stored may perform a hash function on the content. The node then determines a node having a logical identity that is close to the result of the hashed content. The node having on which the file or content is stored may then inform node having a logical identity that is close to the result of the hashed content using a well known method. The methods described below may then be associated with the file or content.

FIG. 4A illustrates a DHT (e.g., DHT 19) that includes only references to physical nodes or peers. As is known, each node or peer is added to the DHT 19 as a result of, for example, an announce message or a ping message. For example, in the known file sharing system for peer-to-peer networks, BITTORRENT, an announce_peer(A) message is used where A is some information about the peer (e.g., address and port). In the BITTORRENT file sharing system, a peer wanting to join the network will send the announce_peer(A) message to a subset of peers in the network.

For example, a BITTORRENT file sharing system peer may have a routing table including the three closest peers. The announcing peer A may send find_peer(hash(A)) messages to the three closest peers. Each of the peers may look-up in their routing tables peers close to node identifier A. The peers return (e.g., using a message) the peers from the look-up to the announcing peer A. This announcing process may occur iteratively until the closest peers to hash(A) are found. Once the closest peers to hash(A) are found, the announcing peer A may send announce_peer(A) messages to the closest peers to hash(A).

As is described above, a receiving peer may add the announcing peer to a DHT 19 associated with the receiving peer. As is known, the receiving peer may use a hash function to determine a unique identifier or key for the announcing peer. For example, the hash function may take as input, information about the announcing peer. The input information may be, for example, "A" (e.g., address and port) from the above BITTORRENT file sharing system example. The output of the hash function may be a bit sequence. The bit sequence (represented by hash_0 and hash_500 in FIG. 4A) may be n bits long (e.g., n=160).

As will be appreciated, there will be $2^n$ distinct outputs from the hash function. Therefore, $2^n$ entries may exist in the DHT 19 identifying $2^n$ nodes (logical or physical). As is known, because there may be a limited number of distinct nodes, it may be possible to logically separate each node by using a hash function that assigns bit sequences to each node or peer with relatively large numerical differences.

The receiving peer (e.g., node 40a) may then add the announcing peer (e.g., node 40d) to the receiving peers' DHT 19 in a <key, value> pairing, where the key is the result of the hash function (described above) and the value is some information regarding the entry in the DHT 19. For example, the value may be a node identification or name, information about the network or information about the content (described in more detail below)). FIG. 4A shows a value of node_ID=computer_1 and node_ID=computer_2 for hash_0 and hash_500 respectively.

Example embodiments, as described above and below, may store the <key, value> pair such that the value is blank and the key (e.g., hashed bit sequence) alone may include any necessary information. For example, the key (being a hashed key based on the peer or as described below, content) may be used as a look-up value for another table stored in, for example, database 52 and/or database 53.

The receiving peer may not store information for all received announce messages. For example, as is known, the BITTORRENT™, registered to BitTorrent Inc., file sharing system uses a DHT 19 known in the art as Kademlia. The hash function in Kademlia outputs identifiers or keys for nodes such that a bitwise exclusive or (XOR) determines a logical distance between the nodes. For example, in Kademlia, given two identifiers or keys, a and b (e.g., hash_0 and hash_500 from FIG. 4A), Kademlia defines the distance between them as their bitwise XOR. A Kademlia peer may only store nodes for each of the 0<i<160 bits of its identifier or key peers having an XOR distance of 2^i<d<2^(i+1) from itself in the peers' DHT.

FIG. 4B illustrates a DHT (e.g., DHT 19) that includes both references to physical nodes or peers and references to nodes identifying content. As is known, an announcing peer (e.g., node 40d) announces content in much the same way as a peer announces itself. However, the announcement may include some indication of the content as well. For example, continuing with the BITTORRENT file sharing system example from above, the announce message may be announce_peer(A,B) where the additional parameter B is an indication of the content.

As is known, a receiving peer may add the announced content to the receiving peers' DHT 19 in much the same way as the receiving peer adds an announced peer as described above. However, the receiving peer may also store information regarding the content. The DHT 19 does not store the content itself, by contrast the DHT 19 stores some information that may be useful for referencing the content.

As is known, the hash function may take as input a node identification (e.g. the nodes address) or a representation of the content. The hash function then outputs a bit sequence based on, for example, the peers' address or the content title. As described above, a peer may only store announcements of content from peers satisfying the Kademlia XOR distance.

As described above, a <key, value> pairing may be stored in the DHT. As described above, the key may be the bit sequence output from the hash function. The value may be as described above; however, the value may also contain some information regarding the file or content. For example, the address of the peer hosting that file or content, the value may also include a name of the file, a pointer to a memory location of the file on the peer storing the file or a type of file (e.g., video, audio, program).

Figure 5:
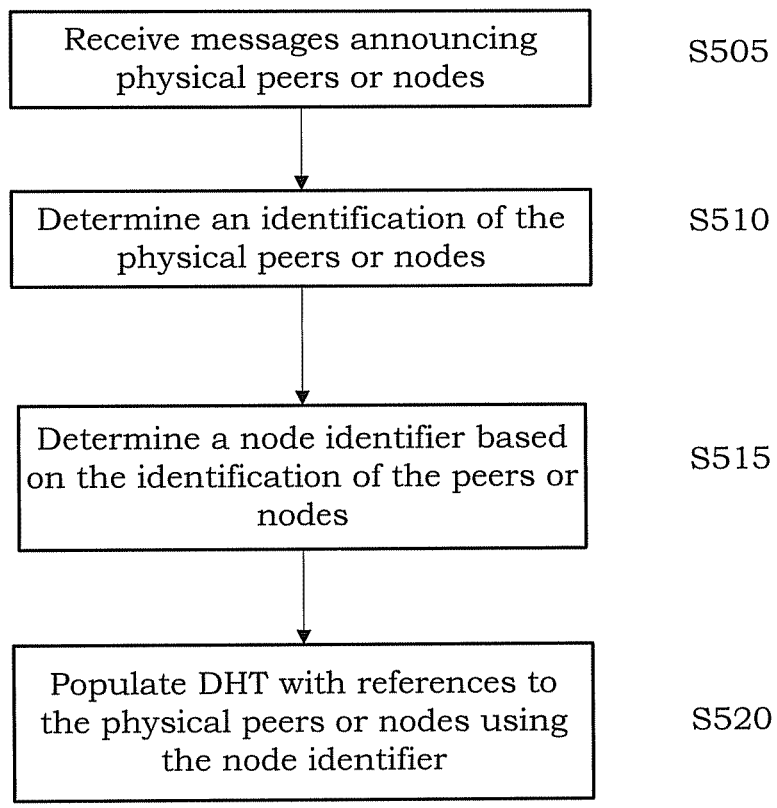
FIG. 5 illustrates a flow chart of the method for announcing peers according to example embodiments.
Figure 6:
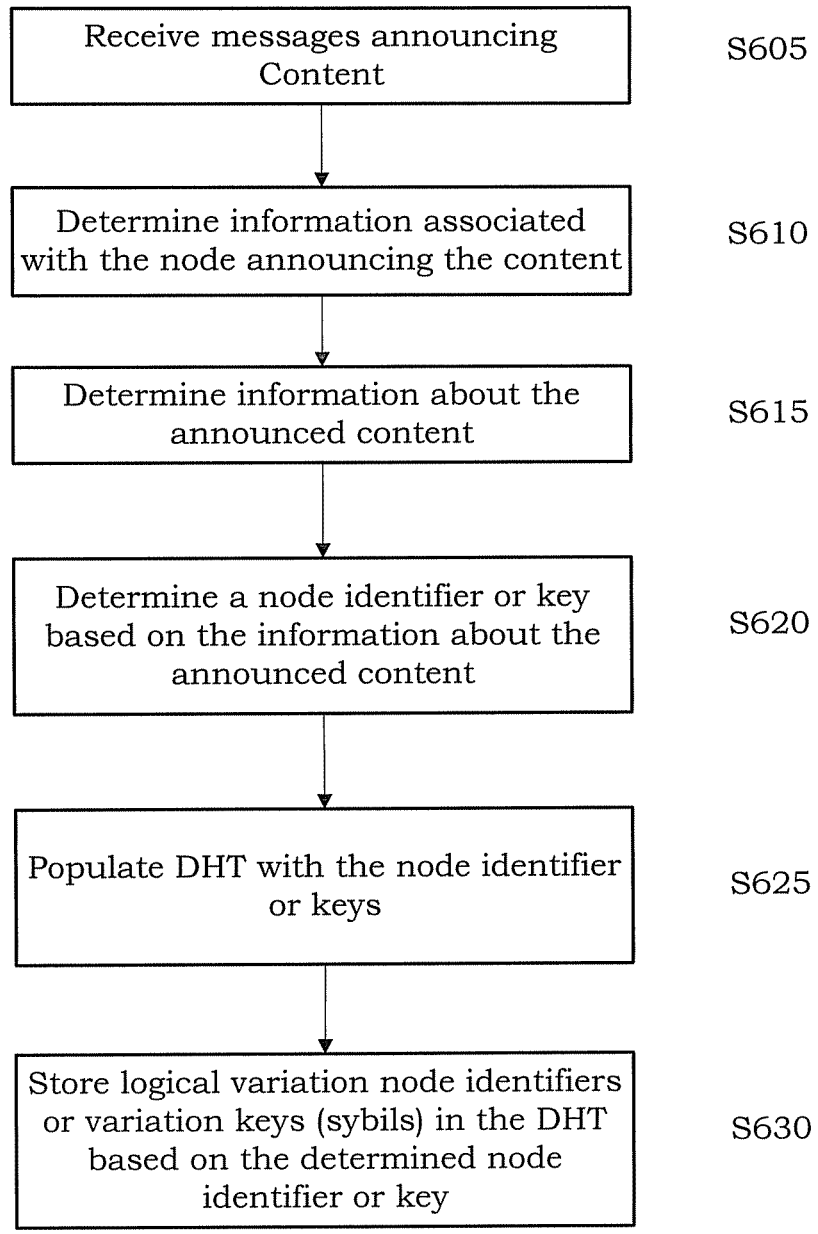
FIG. 6 illustrates a flow chart of the method for storing node identities (sybils) according to example embodiments.
Figure 7:
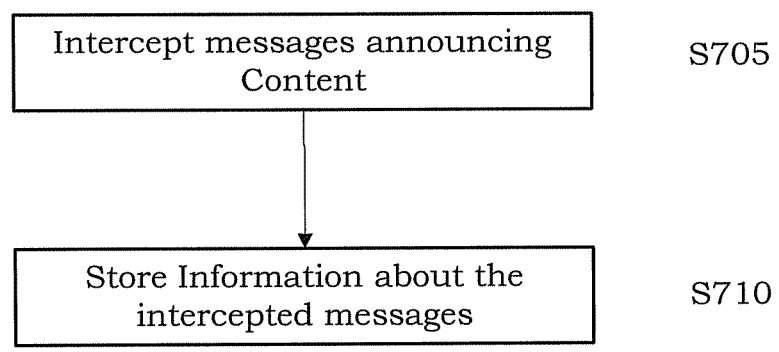
FIG. 7 illustrates a flow chart of the method for intercepting messages announcing content according to example embodiments.
Figure 8:
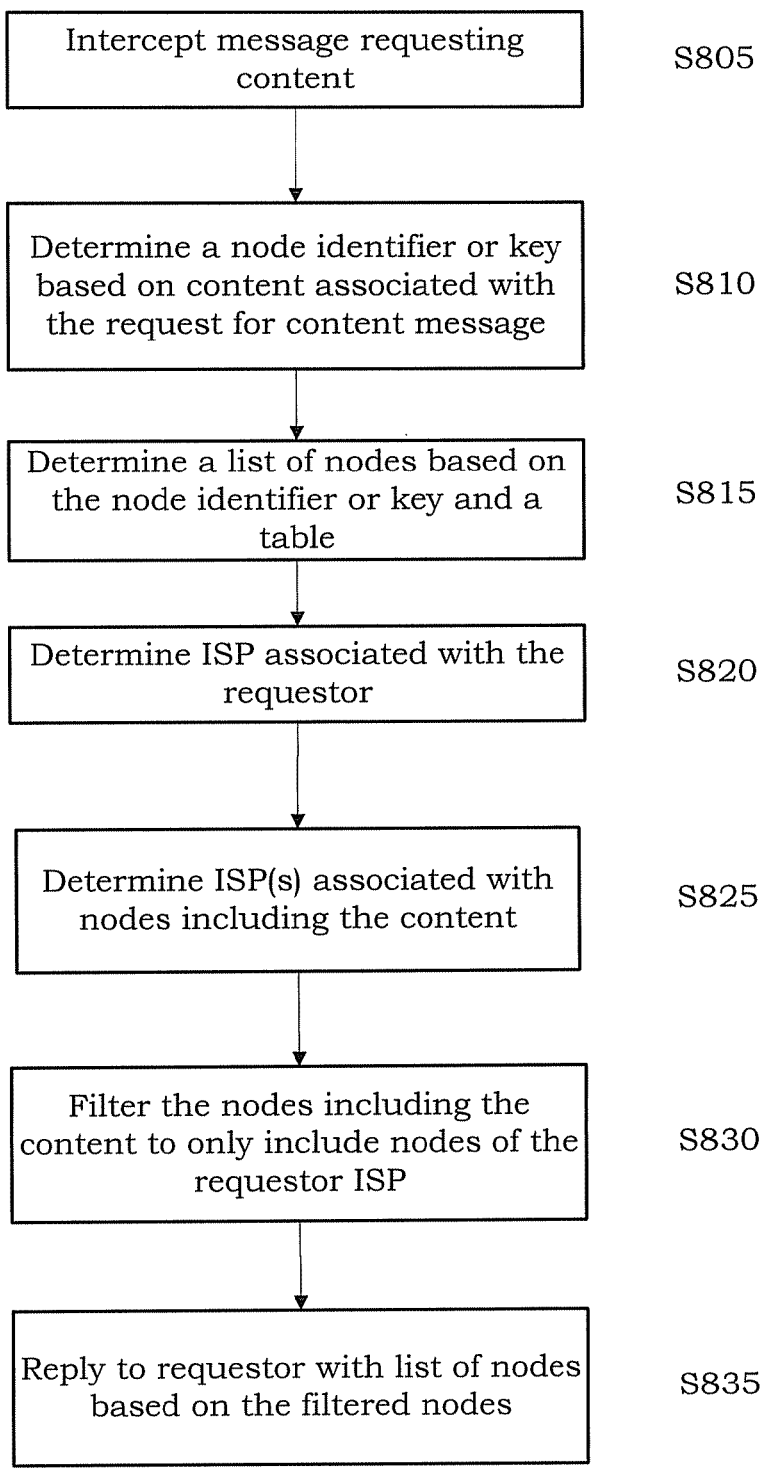
FIG. 8 illustrates a flow chart of the method for intercepting messages requesting content according to example embodiments.

Each of the first and the second processes will be described below in more detail with regard to FIGS. 5-8. FIG. 5 illustrates a flow chart of a method for announcing peers according to example embodiments. FIG. 6 illustrates a flow chart of the method for storing node identities (sybils) according to example embodiments. FIG. 7 illustrates a flow chart of a method for intercepting messages announcing content according to example embodiments. FIG. 8 illustrates a flow chart of the method for intercepting messages requesting content according to example embodiments.

While describing the steps of the method associated with FIG. 5, reference will be made to the networks of FIG. 2 and FIG. 3. Further reference will be made to the example distributed hash table (DHT) as shown in FIG. 4A. Still further, FIG. 5 illustrates populating a DHT with physical peers as described above with regard to FIG. 4A.

In step S505 peer messages announcing physical peers or nodes (e.g., nodes 40a and 40b) may be received. For example, announce peer messages may be received as described above with regard to FIG. 4A. Alternatively and/or in addition to receiving announce peer messages as described above, as known in the art, a ping message may be received. The ping message may include some identification of a peer or node that initiated the ping message.

In step S510 an identification of the physical peers or nodes is determined. For example, as described above with regard to FIG. 4A, the announce peer message may include some information about the peer or node. This information may be, for example an address and/or a port associated with the peer or node. The identification may also be, for example a node identifier or key (e.g., a hashed key) as described above with regard to FIG. 4A.

In step S515 a node identifier or key based on the identification of the physical peers or nodes is determined. For example, as described above with regard to FIG. 4A, the hash function may be used to determine a unique identifier or key for an announcing peer or node. For example, the hash function may take as input, information about the announcing peer. The output of the hash function may be a bit sequence. The bit sequence (represented by hash_0 and hash_500 in FIG. 4A) may be n bits (e.g., n=160).

Alternatively, if in step S510 the identification is a hashed key, step S515 may determine to use the hashed key as the node identifier or key.

In step S520, a DHT 19 is populated with references to the physical peers or nodes using the node identifier or key. For example, as described above with regard to FIG. 4A, a DHT 19 may be populated with peers or nodes being referenced as <key, value> pairings. The DHT 19<key, value> pairings may be such that the key is the result of the hash function and the value is some information regarding the entry in the DHT 19. Alternatively, as described above, the value may be a blank entry. The steps of FIG. 5 may be performed repeatedly throughout the life of a peer-to-peer network 18.

FIG. 6 illustrates a flow chart of the method for storing node identities (sybils) according to example embodiments. While describing the steps of the method associated with FIG. 6, reference will be made to the networks of FIG. 2 and FIG. 3. Further reference will be made to the example distributed hash table (DHT) as shown in FIG. 4.

In step S605 messages announcing content are received by a peer or node (e.g., nodes 40a or 40b). For example, as described above with regard to FIG. 4B, announce peer messages may be received. As described above, the announce peer message may include some information about the peer or node transmitting the message and some information about the content being announced.

In step S610 information associated with the node and/or an identification of the node including the content may be determined. For example, as described above with regard to FIG. 4B, the announce peer message may include some information about the peer or node. This information may be, for example an address and/or a port associated with the peer or node.

In step S615 information about the content may be determined. For example, as described above with regard to FIG. 4B, the announce peer message may include some information about the content.

In step S620 a node identifier or key based on the node information and/or identification of the physical peers or nodes and the content is determined. For example, as described above with regard to FIG. 4B, the hash function may be used to determine a unique identifier or key for the content. For example, the hash function may take as input, information about the announcing peer (e.g., node information) or the content (e.g., content information). The node information identifies the node announcing the content and the content information identifies the content. The output of the hash function may be a bit sequence. The bit sequence (represented by hash_0 and hash_500 in FIG. 4A) may be n bits (e.g., n=160). Alternatively, the announce message may include a hashed key representing the content and in step S20 this hashed key is retrieved from the message and used as the node identifier or key.

In step S625, a DHT 19 may be populated with the node identifier or key, the key and/or references to the content. For example, as described above with regard to FIG. 4B, a DHT 19 may be populated with the content being referenced as <key, value> pairings. The DHT 19<key, value> pairings may be such that the key is the result of the hash function and the value is some information regarding the entry in the DHT 19. Alternatively, as described above, the value may be a blank entry and the key may be used as look-up key in another table or database.

In step S630 logical variation node identifiers and/or variation keys (also known as sybils as described above), based on the node identifiers or keys determined in step S620, may be stored in (e.g., announced to) the DHT 19. For example, in FIG. 4C the logical variation node identifiers and/or variation keys are shown having a hashed key of hash_547, hash_548, hash_549, hash_551, hash_552 and hash_553 and the file or content is the same as a hashed key of hash_550.

For example in step S625 a key may be stored in a table (e.g., DHT 19), the key may be based on the announce message. The key may include content information. The content information may identify the content. The announcing node may also announce k (k being an integer value greater than or equal to one) replicas of the key identifying the content on different nodes in order to achieve robustness. These k replicas are stored on the k nodes in the DHT 19 being closest to the key, identifying the content to announce.

For example, in step S630, the node may store n (n being an integer value greater than equal to two) variation keys in the table. Each of the plurality of variation keys may be a variation of the stored key or the one of k replicas if the node is not the announcing node. In other words, the variation keys may be sybils of the stored key (or one replica) based on the announce message with some with some variation of the key. The sybils with the variation of the key may then be entered into the DHT 19.

For example, micro-processor 46 may store the n logical variation node identifiers and/or variation keys (e.g., keys) in a DHT 19. Storing the n logical variation node identifiers and/or variation keys in the DHT 19 in relation to a file or content may involve, for example, determining node identifications for file or content. Then assigning node identifications to the logical variation node identifiers and/or variation keys. For example, Micro-processor 46 may read the hash key (e.g., hash_550), and perform logical addition or subtraction to the hash key to determine each of the logical variation node identifiers and/or variation keys (e.g., keys). The n logical variation node identifiers and/or variation keys may then be stored in the DHT 19.

For example, each of the n logical variation node identifiers and/or variation keys may be logically one bit from the next closest logical identifier or key starting from the hash key of the stored file or content. As shown in FIG. 4C, hash_551 may be logically one bit away from hash 550, hash_552 may be logically one bit away from hash 551, and so forth. Although example embodiments describe a one bit separation, example embodiments are not limited thereto.

The node identifications associated with the logical variation node identifiers and/or variation keys may share a number of prefix bits in common with the node identification (e.g., hash key) associated with the file or content (e.g., hash key hash_550). For example, the node identifications or keys associated with the logical variation node identifiers and/or variation keys may share at least p bits in common within the set of bits associated with the node identification. p can be determined by the number of participating nodes in the DHT 19. If N is the total number of nodes in the DHT 19 at least p must be greater than b, where $2^b=N$; $\lg_2 N=b$.

Preferably, the DHT 19 will include n equal to at least 256 logical variation node identifiers and/or variation keys for each file or content in the DHT 19 determined to be a file or content for localization. Each having node identifications sharing at least p equal to 24 prefix bits in common.

As one skilled in the art will appreciate, the logical variation node identifiers and/or variation keys may be stored in relation to or associated with all the files or content represented in the DHT 19. Alternatively, some subset of the files or content represented in the DHT 19 may have logical variation node identifiers and/or variation keys associated with them.

For example, popular files may have associations stored in the DHT 19 in step S625. A popular file may be, for example a file that is frequently accessed or communicated. It may prove difficult to monitor all files or contents available in a DHT 19 as this may require introduction of millions of logical variation node identifiers and/or variation keys with the consequence of very high load at the machines (e.g., network element 45) responsible for the logical variation node identifiers and/or variation keys. Further, monitoring each file may be unnecessary given that the majority of the traffic as well as the only traffic that can be localized may be associated with a few files (e.g., the popular files).

Further, the logical variation node identifiers and/or variation keys, may have bit sequences that are logically or bitwise closer in value to the node representing the file or content, than node identifiers and or keys associated with a node representing a peer (e.g., physical node or computer). The bit sequence may be based on a hash function of content information, the bit sequence may include a first series of bits representing a prefix and a second series of bits representing the content. The logical variation node identifiers and/or variation keys may include a varied subset of the first series of bits to generate each of the plurality of first variation keys.

A peer (e.g., node 40d) on which the logical variation node identifiers and/or variation keys are stored (e.g., the logical variation node identifiers and/or variation keys stored in step S625) may also inform peers (e.g., nodes 40a and 40b) of their existence. For example, in the BITTORRENT file sharing system as described above, a peer (e.g., node 40d) may send a known message to peers determined to be close to the peer. The known message may be a ping message for each of the logical variation node identifiers and/or variation keys. Each of the ping messages may include one of the logical variation node identifiers and/or variation keys (e.g., hash key or bit sequence). Close peers may be determined using a known method. For example, close peers may be stored in a routing table or determined using another message type.

FIG. 7 illustrates a flow chart of the method for intercepting messages announcing content according to example embodiments. While describing the steps of the method associated with FIG. 7, reference will be made to the networks of FIG. 2 and FIG. 3. Further reference will be made to the example distributed hash table (DHT) as shown in FIG. 4D-F.

In step S705, messages announcing content may be intercepted. The announce message has a destination address associated with the logical node intercepting the message. Step S705 is very similar to step S605 (as described above with regard to FIG. 6) with one important distinction. In step S605 the announce messages were destined for a physical peer whereas in step S705 the message is intercepted by a logical node. In other words the announcing peer sent a message that otherwise would not have been received had the logical node not been in the DHT 19.

Further, for a received announce message as in step S605, the DHT is populated with node identifiers or keys associated with the content (step S625). By contrast, in step S710 information about the intercepted message may be stored.

The information may be known as characteristic information of the message and may be stored in relation to a key. The storing of characteristic information associated with variation keys may include storing, characteristic information associated with the announce message associated with the key on which the variation key is based. The characteristic information may include node related information and content related information.

The node related information may include at least one of an Internet service provider of a node associated with the second message, a name of the node associated with the second message, an address of the node associated with the second message, and a port of the node associated with the second message. The content related information may include at least one of a description of the content, a type of the content, a size of the content, a pointer to the content and a storage location associated with the node associated with the second message.

As described above with regard to step S705, the node may intercept an announce content message. The announce content message may include characteristic information. The characteristic information may be stored in a database. For example, the characteristic information may be stored in the database, for example, database 52 or database 53, in relation to a variation key related to an address of the announce message. If the destination address associated with the intercepted announce message does not have any relationship with any stored variation keys, the announce message may be assumed to be a received announce message and processed according to the message described above with regard to FIG. 4.

The information may be stored in, for example, database 52, database 53, and/or some other memory associated with the peer, node or peer-to-peer network. The information may be stored in relation to the file or content (e.g., in relation to the node identifier or hash key), the peer sending the message, the peer receiving the message, a network associated with the peer sending/originating the message and/or a network associated with the peer receiving the message. The information may be stored in relation to the file or content and an Internet service provider (ISP) associated with the peer originating the message (e.g., the local network where the content resides). Database 53 may include information associating node identifications (e.g., addresses of the nodes or peers) and an ISP.

Alternatively and/or in addition to the above description, in step S710 the information may be stored in the DHT 19. For example, as described above, the entries in the DHT 19 may be stored in <key,value> pairs. The aforementioned information may be stored as entries in the DHT as a value. As shown in FIG. 4D, a received announcement is an announce peer message. A destination associated with the announce peer message matched with hash_551. Therefore, a new value (node_ID=computer_3) is added to the value field for hash_551.

For example, as shown in FIG. 4D, an intercepted announcement is an announce peer message. A destination associated with the announce peer message matched with hash_551. Therefore, a new value (node_ID=computer_3) may be added to the value field for hash_551.

For example, as shown in FIG. 4E, an intercepted announcement is an announce content message. A destination associated with the announce content message matched with hash_549. Therefore, a new value (node_ID=computer_3, content=content_2) may be added to the value field for hash_549.

For example, as shown in FIG. 4F, a plurality of received announcements announce content from a plurality of nodes. A destination associated with the announce content messages matched with hash_549. Therefore, a plurality of new values may be added to the value field for hash_549.

Although example embodiments show adding new values to an existing DHT entry, those skilled in the art will appreciate that it is possible to add new entries with duplicate keys (e.g., hash key).

Upon completion of the process illustrated in FIGS. 6 and 7, the peer-to-peer network may be constantly aware of the peers holding the file or content. Under this premise, localization may be perfoi med.

FIG. 8, details responding to queries for files and/or content with localized peer-sets or lists of nodes. FIG. 8 illustrates a flow chart of the method for intercepting messages requesting content according to example embodiments.

While describing the steps of the method associated with FIG. 8, reference will be made to the networks of FIG. 2 and FIG. 3. Further reference will be made to the example distributed hash table (DHT) as shown in FIG. 4D-F.

In step S805 a message requesting content is intercepted. The messages may be received from peers within the peer-to-peer network. Alternatively, a message may have been a message internal to a peer (e.g., peer 40*a*). The message may include an indication of the requested content, an identifier or key indicating the sender of the message (e.g., a node or peer requesting content) and/or an identifier or key indicating a destination of the message. The message requesting content may include a destination address.

For example, as described above, one well known file sharing system for peer-to-peer networks is known as BITTORRENT. The BITTORRENT file sharing system uses the get_peer object to make the aforementioned content request. A peer sends get_peer messages to the k peers whose node identifications the peer is already aware of (e.g., stored in a DHT associated with the peer making the request). There is some probability that the k peers are dispersed widely throughout the peer-to-peer network.

As is known, peers in a BITTORRENT file sharing system respond with messages of other known peers. For example, if the responding peer does not know of any peers including the content, the responding peer replies with a list of known peers that the requesting peer may send a message to in a next iteration, peers which identifiers are closer to the identifier of the requested file. As is known, this iterative process repeats until the get_peer message is replied to with a list of peers that hold a copy or a portion of the requested content. The list of peers may include, for example an address of the peer and a port number to access the content through.

As one skilled in the art will appreciate, and as discussed above, there may be millions of files or content associated with the peer-to-peer network. There also may be millions empty entries (or non-entries) in a DHT 19 representing the peer-to-peer network. As such, messages may not reach all peers aware of potential node identifiers or keys within the peer-to-peer network that may have the requested content. Therefore, in conventional peer-to-peer networks there is a high likelihood that network peers may not receive the messages requesting the content and therefore may not respond with a message including an indication of the existence of some content within the peer-to-peer network.

However, as described above with reference FIG. 6, example embodiments, the DHT 19 may include a number of logical variation node identifiers and/or variation keys. Each of the logical variation node identifiers and/or variation keys may include information related to the file or content in the DHT 19. For example, as shown in FIG. 4F, the node associated with hash key hash_549 includes information showing that computers 3-7 have at least some portion of content 2.

By doing so, in the iterative process described above, there is a relatively higher probability that logical variation node identifiers and/or variation keys stored in a table (e.g., DHT 19) on a peer or node (e.g., peer 20a) that information related created by varying the identifier of the requested content may receive or intercept the request for the requested content. For example, if a designer of a system, using well known tools, may realistically design a system to intercept all requests for content.

Returning to FIG. 8, in step S810 a node identifier or key may be determined based on the content the request for content message. For example, the request for content message may include the node identifier or key associated with the requested content. In that case, the node may read the request message to determine the node identifier or key. Alternatively, the requested content may be used as an input to the hash function (described above) to determine the node identifier or key.

In step S815 it is determined if a node knows where the requested content may be found. And a list of nodes including the content may be created. This determination may be made using well-known methods. For example, as described above, a key search may be performed on DHT 19. Assuming a receiving peer (e.g., 40a) includes a DHT 19 in the state as show in FIG. 4F. If a peer (e.g., 40d) makes a request for content 3, the receiving peer may perform a key search of the DHT. The receiving peer may not find any information regarding content 3. Therefore, as is known, the receiving peer responds with a list of peers that the receiving peer knows about (e.g., computers 1-7).

On the other hand, if the peer makes a request for content 2, the receiving peer will again perform a key search of the DHT. This time the receiving peer finds peers including the content. (e.g., computers 3-7). As is known, in conventional art systems, the receiving peer would reply with a message including all of the peers found as a result of the search.

Further, as described above, the logical variation node identifiers and/or variation keys, may have bit sequences that are logically or bitwise closer in value to the node representing the file or content, than node identifiers and or keys associated with a node representing a peer (e.g., physical node or computer). The bit sequence may be based on a hash function of the node information and the content information, the bit sequence may include a first series of bits representing a prefix and a second series of bits representing the content. The logical variation node identifiers and/or variation keys may include a varied subset of the first series of bits to generate each of the plurality of first variation keys.

Determining the list of nodes may include, determining which entries in the DHT 19 have keys or variation keys with the first series of bits matching the first series of bits in the first key and generating the list of nodes from the determined entries such that nodes associated with the determined entries have characteristic information indicating the requested content.

However, according to example embodiments, only local peers associated with the requesting peers' network (e.g., ISP) may be provided in the reply. Therefore, in step S820 an ISP associated with the requestor is determined. For example, micro-processor 46 may make a comparison of an address associated with the requesting peer with network information retrieved from database 53. Alternatively and/or in addition to, micro-processor 46 may use information read from the DHT 19. For example, micro-processor 46 may use information stored in the value field associated with the requesting peer.

In step S825 an ISP associated with each of the nodes found in step S815 is determined. For example, micro-processor 46 may make a comparison of an address associated with the each of the nodes with network information retrieved from database 53. Alternatively and/or in addition to, micro-processor 46 may use information read from the DHT 19. For example, micro-processor 46 may use information stored in the value field associated with each of the nodes.

In step S830 the list of nodes is filtered based on the requestors ISP determined in step S820. The filtered list of nodes may include only those nodes that are associated with a same ISP as the requestor. The filtered list of nodes may also include nodes with relatively good quality and/or relatively inexpensive connectivity (e.g. peering agreements) with respect to the requestor. In step S835 the requestor is replied to with a message including a peer-set or list of nodes based on the filtered list of nodes.

For example, in step S820, micro-processor 46 may determine that the requesting node is a member of network 24. In addition, in step S825, micro-processor 46 may determine that computers 3, 4 and 7 are members of network 24. Further, in step S825, micro-processor 46 may determine that computers 5 and 6 are members of network 26. According to example embodiments, the local peer-set or list of nodes of step S830 will include computers 3, 4 and 7 and not include computers 5 and 6.

If the filtered list of nodes is less than a threshold number, additional nodes may be added to the list of nodes, the additional nodes may include nodes filtered from the list of nodes.

Although the example embodiments above refer to ISP networks, example embodiments are not limited thereto. For example, in FIG. 8 an ISP may be replaced with any local network associated with, for example, the requesting peer or node and the nodes of the peer-set or list of nodes in the reply.

Node identifiers and keys associated with content and their logical variation node identifiers and/or variation keys way have a lifespan. If a threshold period of time associated with any identifier or key expires, the entry in the table associated with the identifier or key may be deleted. For example, after a threshold period of (e.g., 30 minutes or 2 hours) expires since the entry of a key in DHT 19, the entry may be deleted.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

As one skilled in the art will appreciate, and as discussed above, there may be millions of files or content associated with the peer-to-peer network. There also may be millions empty entries (or non-entries) in a DHT 19 representing the peer-to-peer network. As such, messages may not reach all peers aware of potential node identifiers or keys within the peer-to-peer network that may have the requested content. Therefore, in conventional peer-to-peer networks there is a high likelihood that network peers may not receive the messages requesting the content and therefore may not respond with a message including an indication of the existence of some content within the peer-to-peer network.

However, as described above with reference FIGS. 6 and 8, in example embodiments, the DHT 19 may include a number of logical variation node identifiers and/or variation keys. Each of the logical variation node identifiers and/or variation keys may include information related to the file or content in the DHT 19. For example, as shown in FIG. 4F, the node associated with hash key hash_549 includes information showing that computers 3-7 have at least some portion of content 2. By doing so, in the iterative process described above, there is a relatively higher probability that a peer or node (e.g., peer 20a) that information related to the requested content may receive or intercept the request for the content.

In addition, the information stored in relation to the logical variation node identifiers and/or variation keys may include references to networks (e.g., ISPs) associated with node information stored in the DHT (or elsewhere). Response messages to requests for content, therefore, may only include lists of nodes or peer-sets that are associated with a same network as a sender of the request for content.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for localizing content in a peer-to-peer network, the method comprising:
    intercepting, by a node of the peer-to-peer network, a request message, the request message being a request for content, the request message including a destination address;
    determining, by the node, a first key based on the destination address;
    determining, by the node, a list of nodes based on the first key and a table,
        the table including a plurality of entries, each entry having one of a key and a variation key of a plurality of variation keys, at least one key being based on an announce message, the key representing content information, the key having an associated value representing node information, the node information identifying a node announcing content, and the content information identifying the content and each variation key being a variation of one of the keys, each of the plurality of variation keys being generated by varying at least one of the node information and the content information, and at least one entry in the table further includes characteristic information, the characteristic information including node related information and content related information, and
        the determining the list of nodes includes,
            determining which entries in the table have keys or variation keys matching the first key,
            generating the list of nodes from the determined entries such that nodes associated with the determined entries have characteristic information indicating the requested content, and
            filtering the list of nodes such that the list of nodes only includes nodes associated with the network associated with the sender of the request message; and
    sending, by the node, to a sender of the request message, a response message, the response message including the list of nodes.

2. The method of claim 1, wherein, for each of the plurality of variation keys, a first series of bits in each of the plurality of variation keys includes at least 24 bits in common with the first series of bits in the first key.

3. The method of claim 1, further comprising:
    intercepting, by the node, a second message announcing second content, the second message including a destination address; and
    storing, by the node, characteristic information associated with the second message in relation to one of the plurality of variation keys if a first series of bits in a key generated based on the destination address matches a first series of bits in one of the plurality of variation keys.

4. The method of claim 3, wherein if the first series of bits in the key generated based on the destination address does not match the first series of bits in one of the plurality of first variation keys, the method further comprises:
    storing, by the node, a second key in the table based on the second message, the second key representing second node information and second content information, the second node information identifying a second node announcing the second content, and the second content information identifying the second content; and
    storing, by the node, a plurality of second variation keys in the table, each of the plurality of second variation keys being a variation of the stored second key.

5. The method of claim 1, further comprising:
    deleting the first key from the table after a threshold period of time expires.

6. The method of claim 1, wherein storing the plurality of first variation keys includes storing at least 256 variation keys.

7. The method of claim 1, wherein
    at least one key includes a bit sequence based on a function of the content information, the bit sequence including a first series of bits representing a prefix and a second series of bits representing content associated with the announce message, and
    at least one variation key includes a varied subset of the first series of bits of the at least one key.

8. The method of claim 7, wherein the bit sequence is determined based on a hashing function of the first node information and the first content information.

9. The method of claim 1, wherein
    the node related information includes, at least one of an internet service provider of a node associated with the announce message, a name of the node associated with the announce message, an address of the node associated with the announce message, and a port of the node associated with the announce message; and
    the content related information includes at least one of a description of the content, a type of the content, a size of the content, a pointer to the peer holding the content and a storage location associated with the node associated with the announce message.

10. The method of claim 1, wherein if the filtered list of nodes is less than a threshold number, additional nodes are added to the list of nodes, the additional nodes include nodes filtered from the list of nodes.

11. A non-transitory computer-readable medium including program code that when executed by a processor, configures the processor to:

intercept a request message, the request message being a request for content, the request message including a destination address;

determine a first key based on the destination address;

determine a list of nodes based on the first key and a table, the table including a plurality of entries, each entry having one of a key and a variation key, at least one key being based on an announce message, the key representing content information, the key having an associated value representing node information, the node information identifying a node announcing content, and the content information identifying the content and each variation key being a variation of one of the keys, each variation key being generated by varying at least one of the node information and the content information, and at least one entry in the table further includes characteristic information, the characteristic information including node related information and content related information, and in the determining the list of nodes, the processor is configured to, determine which entries in the table have keys or variation keys matching the first key, generate the list of nodes from the determined entries such that nodes associated with the determined entries have characteristic information indicating the requested content, and filter the list of nodes such that the list of nodes only includes nodes associated with the network associated with the sender of the request message; and send to a sender of the request message, a response message, the response message including the list of nodes.

12. A node of a peer-to-peer network, the node comprising:

a memory configured to store a table; and a processor configured to, intercept a request message, the request message being a request for content, the request message including a destination address;

determine a first key based on the destination address;

determine a list of nodes based on the first key and the table, the table including a plurality of entries, each entry having one of a key and a variation key, at least one key being based on an announce message, the key representing content information, the key having an associated value representing node information, the node information identifying a node announcing content, and the content information identifying the content and each variation key being a variation of one of the keys, each variation key being generated by varying at least one of the node information and the content information, and at least one entry in the table further includes characteristic information, the characteristic information including node related information and content related information, and in the determining the list of nodes, the processor is configured to, determine which entries in the table have keys or variation keys matching the first key, generate the list of nodes from the determined entries such that nodes associated with the determined entries have characteristic information indicating the requested content, and filter the list of nodes such that the list of nodes only includes nodes associated with the network associated with the sender of the request message; and send to a sender of the request message, a response message, the response message including the list of nodes.

13. The node of claim 12, wherein at least one key includes a bit sequence based on a function of the content information, the bit sequence including a first series of bits representing a prefix and a second series of bits representing content associated with the announce message, and at least one variation key includes a varied subset of the first series of bits of the at least one key.

14. The node of claim 13, wherein the bit sequence is determined based on a hashing function of the first node information and the first content information.

15. The node of claim 12, wherein the node related information includes, at least one of an internet service provider of a node associated with the announce message, a name of the node associated with the announce message, an address of the node associated with the announce message, and a port of the node associated with the announce message; and the content related information includes at least one of a description of the content, a type of the content, a size of the content, a pointer to the peer holding the content and a storage location associated with the node associated with the announce message.

16. The node of claim 12, wherein if the filtered list of nodes is less than a threshold number, additional nodes are added to the list of nodes, the additional nodes include nodes filtered from the list of nodes.

17. The node of claim 12, wherein, for each of the plurality of variation keys, a first series of bits in each of the plurality of variation keys includes at least 24 bits in common with the first series of bits in the first key.

18. The node of claim 12, wherein the processor is further configured to:

Intercept a second message announcing second content, the second message including a destination address; and store characteristic information associated with the second message in relation to one of the plurality of variation keys if a first series of bits in a key generated based on the destination address matches a first series of bits in one of the plurality of variation keys.

19. The node of claim 18, wherein if the first series of bits in the key generated based on the destination address does not match the first series of bits in one of the plurality of variation keys, the processor is further configured to:

store a second key in the table based on the second message, the second key representing second node information and second content information, the second node information identifying a second node announcing the second content, and the second content information identifying the second content; and store a plurality of second variation keys in the table, each of the plurality of second variation keys being a variation of the stored second key.

20. The node of claim 12, wherein the processor is configured to store the plurality of variation keys including storing at least 256 variation keys.

* * * * *